United States Patent [19]

DeLucia

[11] E Re. 29,174

[45] Reissued Apr. 5, 1977

[54] PRESSURIZED RELAY ASSEMBLY

[75] Inventor: Victor E. DeLucia, Santa Monica, Calif.

[73] Assignee: Torr Laboratories, Inc., Van Nuys, Calif.

[22] Filed: Oct. 29, 1975

[21] Appl. No.: 626,645

Related U.S. Patent Documents

Reissue of:

[64] Patent No.: 3,891,950
Issued: June 24, 1975
Appl. No.: 494,825
Filed: Aug. 5, 1974

[52] U.S. Cl. ..... 335/151; 335/154; 200/144 B

[51] Int. Cl.[2] ..... H01H 1/66

[58] Field of Search ..... 335/107, 121, 151, 154, 335/202; 200/144 B

[56] References Cited

UNITED STATES PATENTS

| | | | |
|---|---|---|---|
| 2,938,092 | 5/1960 | Steward | 335/154 X |
| 3,238,324 | 3/1966 | Roessler | 335/121 |
| 3,244,834 | 4/1966 | Fischer et al. | 335/154 |
| 3,296,568 | 1/1967 | Griggs et al. | 335/154 |
| 3,811,102 | 5/1974 | Ash | 335/151 X |

*Primary Examiner*—George Harris
*Attorney, Agent, or Firm*—Bernard Kriegel

[57] ABSTRACT

A high voltage magnetic relay assembly has a double pole, double throw contact assembly enclosed within a housing containing gas, such as sulfur hexafluoride. Terminals surrounded by insulators project from the housing, the terminals and insulators being sealed with respect to the housing to prevent gas leakage therefrom. The contact mechanism includes an operating yoke acting on pivoted contact arms electrically connected to some of the terminals and shiftable to and from contact with other of the terminals.

23 Claims, 9 Drawing Figures

PRESSURIZED RELAY ASSEMBLY

Matter enclosed in heavy brackets [ ] appears in the original patent but forms no part of this reissue specification; matter printed in italics indicates the additions made by reissue.

This invention relates to a high voltage relay assembly wherein the relay contacts are enclosed within a housing which is filled with a pressurized dielectric gas, such as sulfur hexafluoride ($SF_6$), the terminals of the relay projecting from the housing through sealed supports for the terminals.

Heretofore, as disclosed in my prior U.S. Pat. No. 3,604,870 magnetic relay assemblies of the general type here involved have been provided including a glass envelope containing a magnetically operated switching mechanism wherein the envelope has been pressurized with a dielectric gas. Such relay assemblies have been subject to cracking of the envelope under internal pressure ranging from one to four atmospheres and, in some cases, may be subject to explosion due to the internal pressure. Such glass envelope relay assemblies are also expensive.

The present invention contemplates the provision of a metallic housing or envelope, so that the relay mechanism is better able to withstand the internal pressure of the dielectric gas over a substantial period of time. Accordingly, the relay assembly is more economical and experiences less spoilage. In addition, the relay mechanism can be pressurized to a greater extent, thereby enhancing the cooling effect of the gas on the relay contacts and improving the stand-off voltage characteristics of the relay.

In addition to the foregoing, the present invention provides improved mechanical actuating mechanism for shifting the relay contacts. More specifically, the relay is a double pole, double throw relay having a pair of dual spring contacts shiftable by an operating member which is coupled with the contacts at a location spaced outwardly from a central pivot point to produce a greater contact travel than in the prior generally similar relays.

In accomplishing the foregoing, a metallic housing has the relay terminals installed in openings in the housing and supported in sealing supports. The relay contact mechanism includes a pair of dual spring arms pivotally supported within the housing and adapted to be actuated by an electromagnetic which is unitized with the housing. The electromagnet has a pivoted actuator arm provided with a yoke which engages an actuator pin carried by the contact arms at a location spaced from the pivot point of the arms to provide a mechanical advantage.

The present relay, while not limited to any particular use, is particularly well suited for use in heart defribrillator systems wherein a double pole, double throw relay is used to introduce high voltage to the heart of a patient. It is important that the normally closed contacts open while the relay is energized and the normally open contact closed when the relay is deenergized. The dual spring contact mechanism of the present relay is constructed to assure that neither of the normally open nor the normally closed contacts can be opened without the other being closed.

This invention possesses many other advantages, and has other purposes which may be made more clearly apparent from a consideration of the form in which it may be embodied. This form is shown in the drawings accompanying and forming part of the present specification. It will now be described in detail for the purpose of illustrating the general principles of the invention; but it is to be understood that such detailed descriptions are not to be taken in a limiting sense.

Referring to the drawings.

Figure 3:
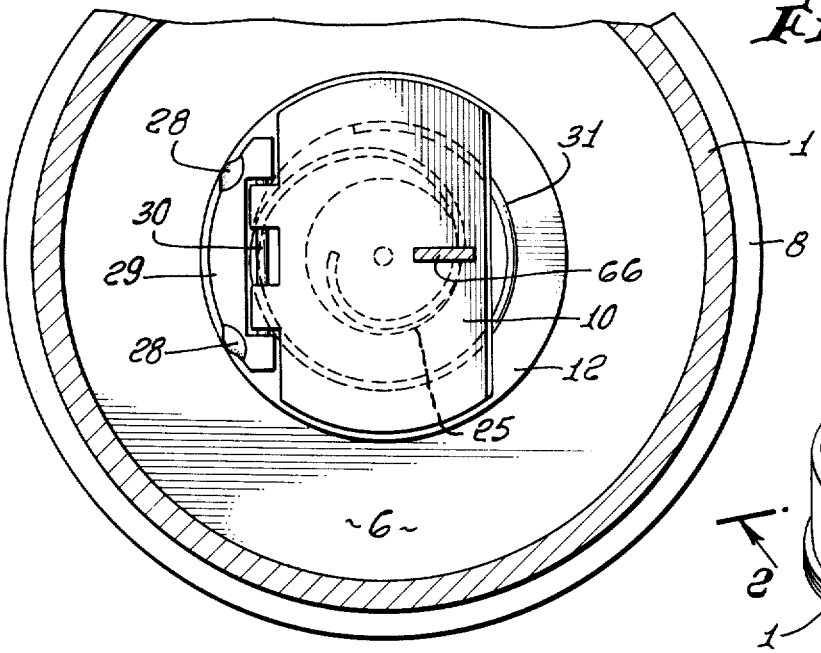
FIG. 3 is a horizontal section, as taken on the line 3—3 of FIG. 2.
Figure 1:
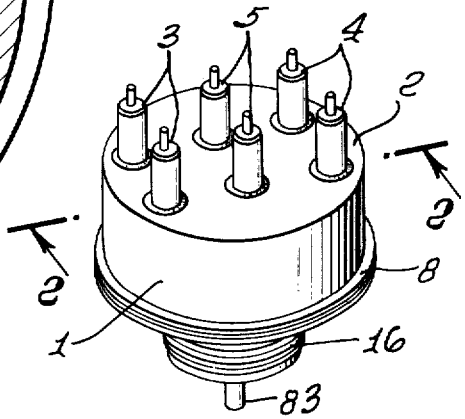
FIG. 1 is a perspective view illustrating a pressurized relay assembly made in accordance with the invention.

As seen in the drawings, the relay assembly comprises a hollow cylindrical housing 1, from the top 2 of which project the six terminals of the relay assembly, including a pair of terminals 3 of normally open contact means, a pair of terminals 4 of normally closed contact means, and a pair of terminals 5 which are the common terminals. The base of the housing 1 is closed by a metal plate 6 welded at its periphery, as at 7, to a base flange 8 of the housing. The plate 6 supports an electromagnet 9 which is adapted to effect oscillation of an actuator arm 10 to effect pivotal movement of dual spring contact means 11, to effect alternate engagement of the contact means 11 with internal contact tips of either the terminals 3 or the terminals 4.

The electromagnet 9 includes a coil housing 12 having an outer mounting flange 13 adapted to cooperate with a typical mounting nut 14 to support the relay assembly in an opening in a supporting plate 15 when the nut 14 is threaded onto the coil housing thread 16. The coil housing 12 is disposed in an opening 17 in the housing closure plate 6 and secured in place by welding, as at 18. Within the coil housing is an electromagnetic coil 19 covered by insulating material 20 and having coil terminals 21 and 22 projecting through a soft iron lower end plate 23 of the coil housing. Within the magnetic coil 19 is a soft iron core 24 having an inner head 25 affixed by brazing at 26 to an inner core support plate 27 of non-magnetic material, such as monel. Internally of the housing 1 and suitably affixed to the coil housing 12, as by brazing at 28, is a support bracket 29 for the actuator arm 10, the arm being pivotally connected to the support 29 by a pivot pin 30.

Disposed between the actuator arm 10 and the core plate 27 is a coiled spring 31, which acts normally to pivot the actuator arm 10 away from the magnetic assembly. When the magnetic assembly is energized, the actuator arm 10, which is composed of magnetic material, such as soft iron, is pulled downwardly.

Figure 8:
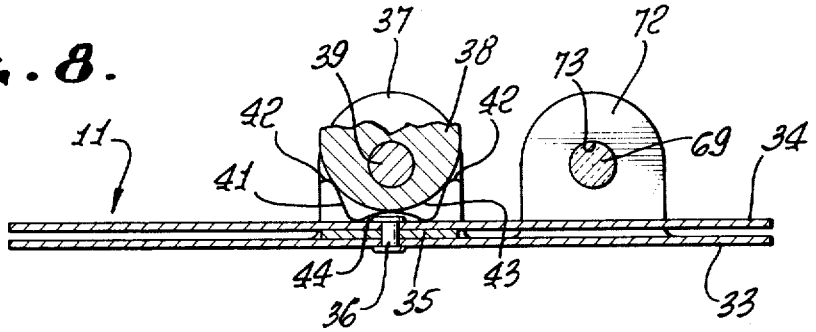
FIG. 8 is a fragmentary section, as taken on the line 8—8 of FIG. 4.
Figure 7:
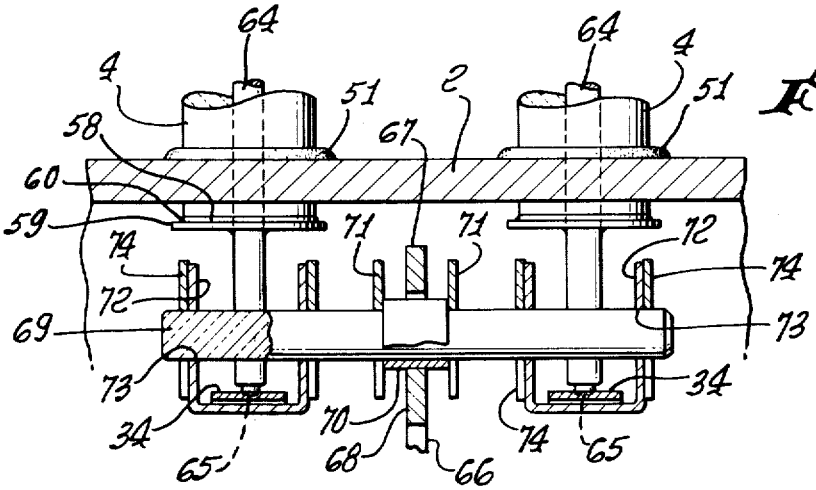
FIG. 7 is a fragmentary vertical section, as taken on the line 7—7 of FIG. 2.

The contact arms 11 are of resilient conductive material, such as molybdenum, and are pivotally supported between their ends beneath the common terminals 5. Each contact arm 11 is an assembly of a lower leaf spring element 33 and an upper leaf spring element 34 spaced apart by a central spacer 35 and fastened together by a rivet 36, or the like. The leaf spring 33 has upstanding support ears 37 at opposite sides, between which is disposed a copper, or other conductive, support block 38. A pivot pin 39 extends through the ears 37 and the support block 38, the assembly being held together by resilient grip rings 40 expansible by the usual applicator tool for mounting on the ends of the pivot pin 39. Interposed between the upper leaf spring 34 and the support block 38, as best seen in FIG. 8, is a conductive spring 41 having contact ends 42 engaged with the arcuate lower wall 43 of the support block 38 and an intermediate portion 44 located between and engaging the upper leaf spring 34 and the block.

Figure 4:
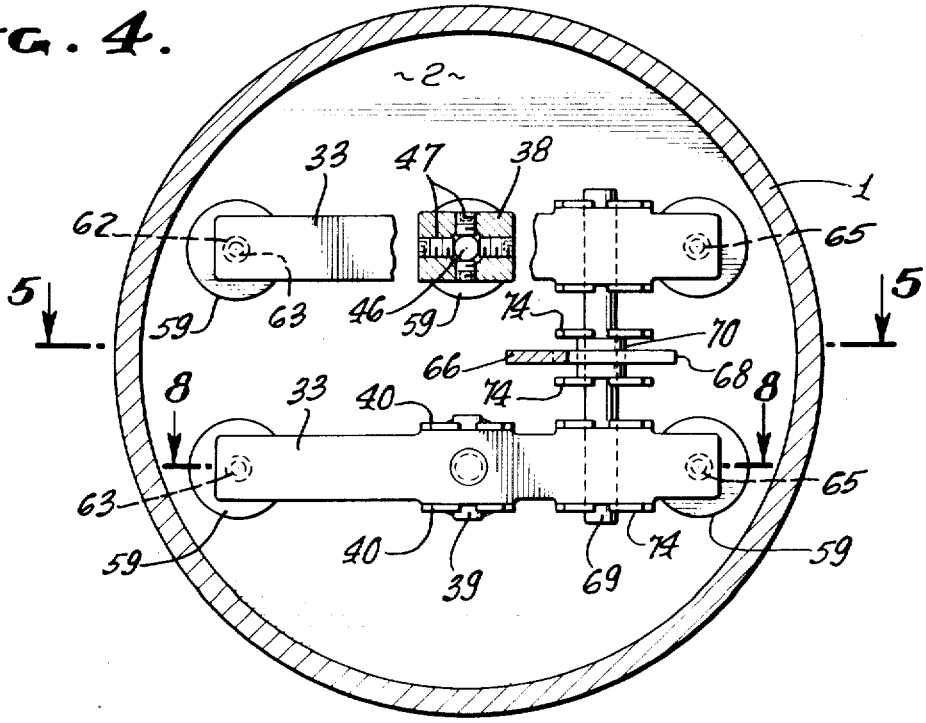
FIG. 4 is a horizontal section, as taken on the line 4—4 of FIG. 2.
Figure 6:
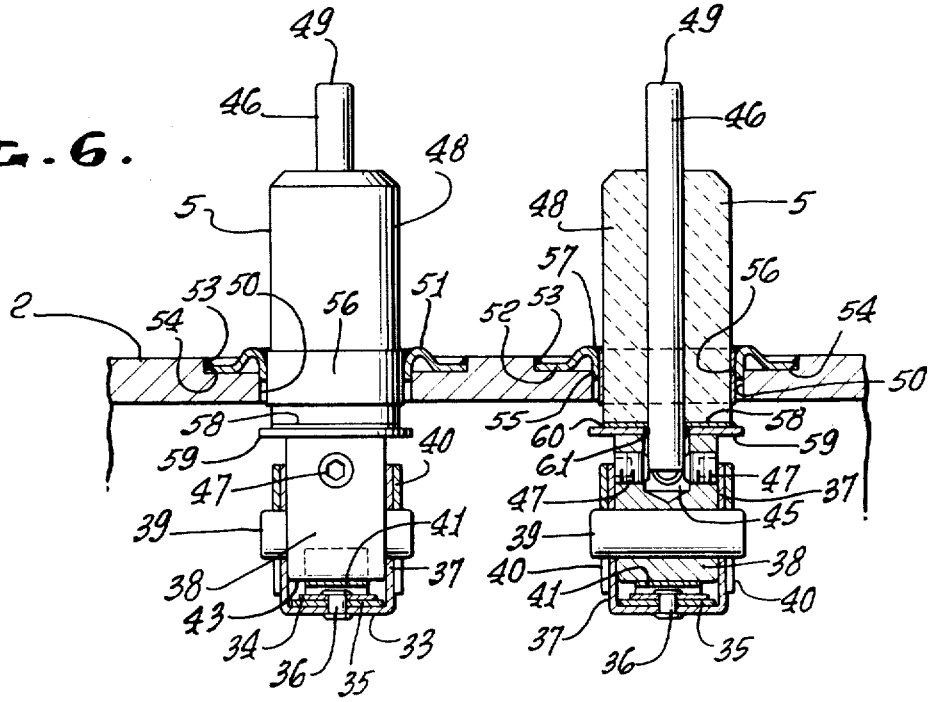
FIG. 6 is a fragmentary vertical section, as taken on the line 6—6 of FIG. 2.

Each support block 38 is fixedly mounted on one of the common terminals 5, as best seen in FIGS. 4 and 6. Each support block 38 has an upwardly opening socket 45 which receives the lower end of a terminal rod 46 of conductive material, the lower end of the rod being gripped between opposing pairs of set screws 47 threaded into the block 38. In the case of each of the common terminal assemblies 5, the terminal rod 46 extends coaxially from the housing through a ceramic insulator sleeve 48 and has its outer end 49 exposed for connection to a conductor lead. This insulator sleeve 48 is supported within an opening 50 in the housing 2 by means of a sealing structure 51, including a washer or disc 52 composed of a material having a coefficient of expansion substantially the same as that of the insulator 48. A suitable material for the washer 52 is an alloy of iron, nickel, and cobalt. This washer is brazed as its outer periphery 53 within a circular recess 54 in the housing. At its inner periphery, the washer 52 has a down-turned flange 55 which extends circumferentially about a metallic band 56, which is sealingly fixed onto the ceramic insulator 48 by brazing. An annular weld 57 unites the flange 55 of the washer 52 with the band 56. The band is preferably composed of an alloy of molybdenum and manganese. At its inner end, the insulator 48 has a disc 58, also composed of a molybdenum-manganese material, brazed onto the inner end of the insulator 48. Brazed on the disc 58 is a lower washer 59 of a material, such as the iron, nickel and cobalt of the washer 52, the brazing material 60 being applied about the entire periphery of the disc 58 and the washer 59, and also being applied at 61 in the annular space between the washer 59 and the terminal rod 46. It is now apparent that the common terminal assemblies are fully sealed within the housing 2 and constitute a pivotal support for the respective contact arms.

In addition, it will be understood that each of the normally open terminal assemblies 3 and normally closed terminal assemblies 4 is sealed within the housing in the same manner as the common terminal assembly 5, specifically described above. In the case of the normally open terminal assemblies 3, a conductor terminal rod 62 extends inwardly and has a tungsten contact point or tip 63 disposed for engagement by the upper contact spring 34 upon energization of the magnet coil 19. The normally closed terminal assembly 4 has a conductor terminal rod 64 provided with an inner tungsten contact point or tip 65 normally engaged by the leaf spring 34, until the magnet coil 19 is energized.

Figure 2:
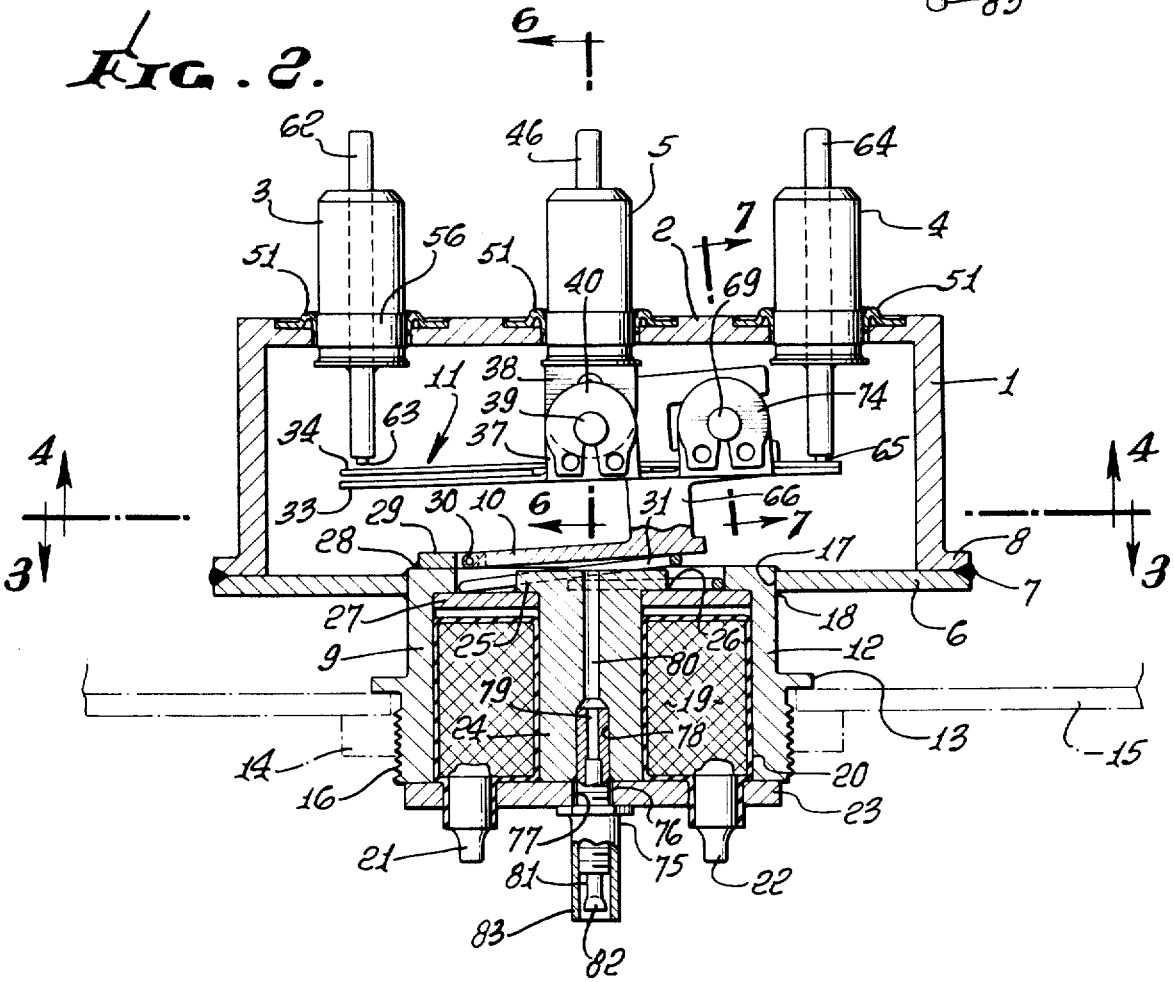
FIG. 2 is an enlarged section, as taken on the line 2—2 of FIG. 1.
Figure 5:
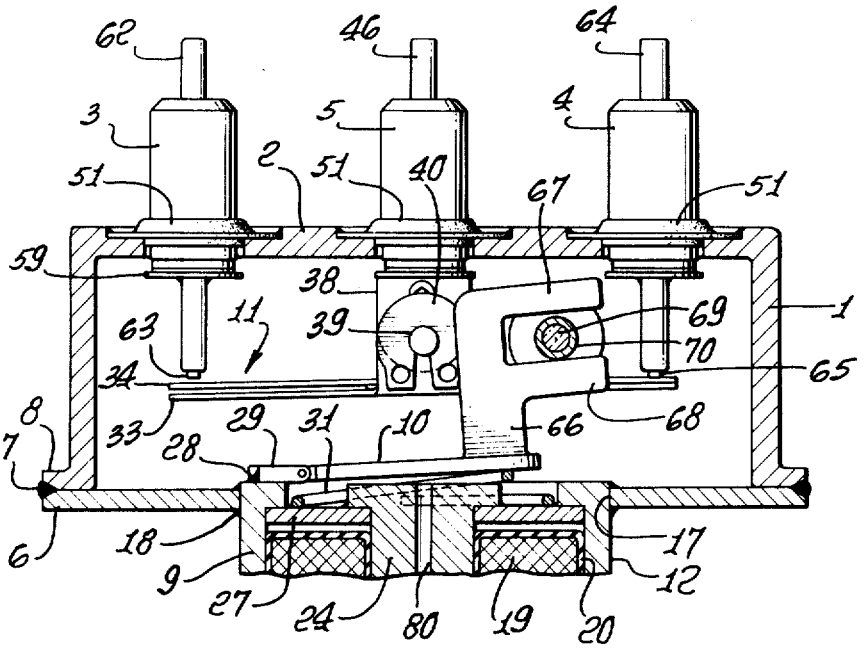
FIG. 5 is a vertical section, as taken on the line 5—5 of FIG. 4, with certain of the parts broken away.
Figure 9:
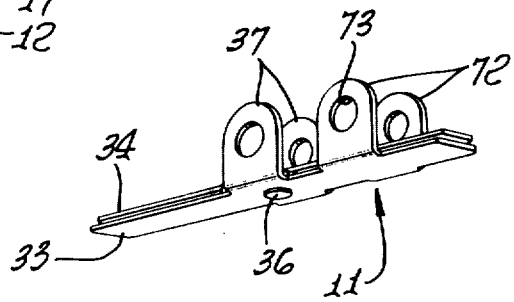
FIG. 9 is a detail view in perspective of the spring contact unit.

As previously indicated, energization of the magnet coil 19 is adapted to effect shifting of the contact arms of the relay between the position of FIG. 2, wherein the contact arms 34 engage the contact points 65 of the normally closed terminals 4, and the alternate position at which the contact arms 34 will engage the contact points 63 of the normally open terminals 3, the contact arms being disengaged from the contact points 65. To accomplish pivotal movement of the contact arms, the actuator arm 10 has a yoke 66 at its free end, comprising a pair of upper and lower fingers 67 and 68 which are disposed above and below a transverse insulating rod 69, which is connected with the respective contact arms so as to shift them between their alternate positions. On the rod 69 is a wear bushing or sleeve 70 disposed between the fingers 67 and 68 of the yoke 66 and retained in place by a pair of laterally spaced resilient grip rings 71 applied to the rod 69. Each of the lower leaf springs 33 of each contact arm assembly has a pair of upstanding ears 72 provided with aligned openings 73 through which the insulator rod 69 extends. Additional resilient grip rings 74 are applied to the rod 69 for engagement with the ears 72 of the leaf spring 33 to retain the rod and leaf spring in assembly. It will now be apparent that energization of the electromagnet and deenergization thereof will cause the contact arms to be actuated between their normally closed and normally open positions by the yoke member 66 of the actuator arm 10, which engages the contact arms effectively at a location spaced from the pivot pins 39 of the contact arms, so as to afford a mechanical advantage.

As previously described, the relay of the present invention has all of its terminals sealed in the housing. It also has its coil housing 12 sealingly connected within the housing plate 6 by the brazed connection 18, so that the housing is adapted to be pressurized to the desired pressure, for example, on the order of one to four atmospheres, with sulfur hexafluoride or other dielectric gas. Pressurization of the housing is accomplished by a fitting 75 comprising an externally threaded bushing 76 which extends through an opening 77 in the magnet end plate and into a bore 78 in the soft iron core 24. The bushing 76 has a passage 79 which communicates with another passage 80 in the magnet core 24 leading into the relay housing. Disposed in the housing 76 is a tube 81 through which the dielectric gas can be supplied to the housing prior to crimping the outer end of the tube at 82 to close the tube and retain the gas within the housing. A suitable cap 83 is preferably threaded on the bushing 76 to protect the tube 81.

I claim:

1. A [ high voltage double pole, double throw ] relay assembly comprising: a metal housing, normally open contact means and normally closed contact means in said housing including terminals projecting from said housing, electromagnetic operating means for closing and opening said contact means upon energization and deenergization of said electromagnetic operating means, means forming a seal between said terminals and said housing, and means for admitting a pressurized dielectric gas into said housing, said means forming a seal including insulators on said terminals, first sealing members sealingly affixed to said insulators, and other sealing members sealingly affixed to said housing and to said first sealing members and said terminals.

2. A [ high voltage double pole, double throw ] relay assembly as defined in claim 1, wherein said first sealing members include first metallic members sealingly engaged with said insulators, and said other sealing members include metallic members brazed to said housing, said terminal and said first metallic members.

3. A [high voltage double pole, double throw] relay assembly as defined in claim 1, wherein said insulators are ceramic insulators, said first sealing members including metallic members brazed onto said insulators, and said other sealing members include metallic sealing members brazed to said housing, said terminal and said first metallic members.

4. A [high voltage double pole, double throw] relay assembly as defined in claim 1, wherein said contact means includes spring contact arms, means pivotally supporting said contact arms, and means actuatable by said electromagnetic operating means for pivoting said contact arms.

5. A [high voltage double pole, double throw] relay assembly as defined in claim 1, wherein said contact means includes spring contact arms, means pivotally supporting said contact arms, and means actuatable by said electromagnetic operating means for pivoting said contact arms, said contact arms including a pair of leaf spring members.

6. A [high voltage double pole, double throw] relay assembly as defined in claim 1, wherein said contact means includes spring contact arms, means pivotally supporting said contact arms, and means actuatable by said electromagnetic operating means for pivoting said contact arms, said contact arms including a pair of leaf spring members, one of said leaf spring members being connected to the other of said leaf spring members.

7. A [high voltage double pole, double throw] relay assembly as defined in claim 1, including common terminals extending through said housing, said contact means including spring contact arms, means pivotally and electrically connecting said spring contact arms to said common terminals, and means connecting said electromagnetic operating means with said spring contact arms.

8. A [high voltage double pole, double throw] relay assembly as defined in claim 1, including common terminals extending through said housing, said contact means including spring contact arms, means pivotally and electrically connecting said spring contact arms to said common terminals, and means connecting said electromagnetic operating means with said spring contact arms including an actuating arm responsive to said electromagnetic means and coupled with said spring contact arms to pivot said spring contact arms.

9. A [high voltage double pole, double throw] relay assembly as defined in claim 1, including common terminals extending through said housing, said contact means including spring contact arms, means pivotally and electrically connecting said spring contact arms to said common terminals, and means connecting said electromagnetic operating means with said spring contact arms including an actuating arm responsive to said electromagnetic means, said arm having a yoke thereon, said spring contact arms having a member engaged by said yoke to pivot said spring contact arms.

10. A [high voltage double pole, double throw] relay assembly comprising: a metal housing, normally open contact means and normally closed contact means in said housing including terminals projecting from said housing, electromagnetic operating means for closing and opening said contact means upon energization and deenergization of said electromagnetic operating means, means forming a seal between said terminals and said housing, and means for admitting a pressurized dielectric gas into said housing, said contact means including spring contact arms, means pivotally supporting said spring contact arms including common terminals extending through said housing, and means pivotally and electrically connecting said spring arms on said common terminals.

11. A [high voltage double pole, double throw] relay assembly as defined in claim 10, wherein said means pivotally and electrically connecting said spring arms on said common terminals includes ears on said spring contact arms and pivot pins connected with said common terminals and said ears.

12. A [high voltage double pole, double throw] relay assembly as defined in claim 10, wherein said means pivotally and electrically connecting said spring arms on said common terminals includes support blocks connected with said common terminals and pivot pins connecting said support blocks with said spring contact arms.

13. A [high voltage double pole, double throw] relay assembly as defined in claim 10, wherein said means pivotally and electrically connecting said spring arms on said common terminals includes ears on said spring contact arms and pivot pins connected with said common terminals and said ears, and including means coupling said electromagnetic operating means to said spring contact arms to pivotally shift the latter upon energization and deenergization of said electromagnetic operating means.

14. A [high voltage double pole, double throw] relay assembly as defined in claim 10, wherein said means pivotally and electrically connecting said spring arms on said common terminals includes ears on said spring contact arms and pivot pins connected with said common terminals and said ears, and including means coupling said electromagnetic operating means to said spring contact arms to pivotally shift the latter upon energization and deenergization of said electromagnetic operating means, said coupling means including an actuator arm pivotally movable upon energization and deenergization of said electromagnetic operating means, said arm having a yoke thereon, and means coupling said yoke to said spring contact arms in spaced relation to the pivotal support of said spring contact arms.

15. A [high voltage double pole, double throw] relay assembly as defined in claim 10, wherein said means pivotally and electrically connecting said spring arms on said common terminals includes ears on said spring contact arms and pivot pins connected with said common terminals and said ears, and including means coupling said electromagnetic operating means to said spring contact arms to pivotally shift the latter upon energization and deenergization of said electromagnetic operating means, said coupling means including an actuator arm pivotally movable upon energization and deenergization of said electromagnetic operating means, said arm having a yoke thereon, and means coupling said yoke to said spring contact arms in spaced relation to the pivotal support on said spring contact arms including a member projecting from said spring contact arms and engaged by said yoke.

16. A [high voltage double pole, double throw] relay assembly as defined in claim 10, wherein said spring contact arms comprise dual leaf springs.

*17. A relay assembly comprising: a housing, normally opened contact means and normally closed contact means in said housing including terminals projecting from said housing, electromagnetic operating means for closing and opening said contact means upon energization and deenergization of said electromagnetic operating means, means forming a seal between said terminals and said housing, and means for admitting a pressurized dielectric gas into said housing, said contact means including spring contact arms, means pivotally supporting said spring contact arms including common terminals extending through said housing, and means pivotally and electrically connecting said spring arms on said common terminals.*

*18. A relay assembly as defined in claim 17; wherein said means pivotally and electrically connecting said spring arms on said common terminals includes ears on said spring contact arms and pivot pins connected with said common terminals and said ears.*

*19. A relay assembly as defined in claim 17; wherein said means pivotally and electrically connecting said spring arms on said common terminals includes support blocks connected with said common terminals and pivot pins connecting said support blocks with said spring contact arms.*

*20. A relay assembly as defined in claim 17; wherein said means pivotally and electrically connecting said spring arms on said common terminals includes ears on said spring contact arms and pivot pins connected with said common terminals and said ears, and including means coupling said electromagnetic operating means to said spring contact arms to pivotally shift the latter upon energization and deenergization of said electromagnetic operating means.*

*21. A relay assembly as defined in claim 17; wherein said means pivotally and electrically connecting said spring arms on said common terminals includes ears on said spring contact arms and pivot pins connected with said common terminals and said ears, and including means coupling said electromagnetic operating means to said spring contact arms to pivotally shift the latter upon energization and deenergization of said electromagnetic operating means, said coupling means including an actuator arm pivotally movable upon energization and deenergization of said electromagnetic operating means, said arm having a yoke thereon, and means coupling said yoke to said spring contact arms in spaced relation to the pivotal support of said spring contact arms.*

*22. A relay assembly as defined in claim 17; wherein said means pivotally and electrically connecting said spring arms on said common terminals includes ears on said spring contact arms and pivot pins connected with said common terminals and said ears, and including means coupling said electromagnetic operating means to said spring contact arms to pivotally shift the latter upon energization and deenergization of said electromagnetic operating means, said coupling means including an actuator arm pivotally movable upon energization and deenergization of said electromagnetic operating means, said arm having a yoke thereon, and means coupling said yoke to said spring contact arms in spaced relation to the pivotal support of said spring contact arms including a member projecting from said spring contact arms and engaged by said yoke.*

*23. A relay assembly as defined in claim 17; wherein said spring contact arms comprise dual leaf springs.*

* * * * *